(12) United States Patent
Tanaka et al.

(10) Patent No.: US 11,828,673 B2
(45) Date of Patent: Nov. 28, 2023

(54) ENVIRONMENTAL TESTING CHAMBER AND AIR-CONDITIONING SYSTEM

(71) Applicant: HITACHI PLANT SERVICES CO., LTD., Tokyo (JP)

(72) Inventors: Makoto Tanaka, Tokyo (JP); Satoru Sugitani, Tokyo (JP); Tsuyoshi Yamada, Tokyo (JP)

(73) Assignee: HITACHI PLANT SERVICES CO., LTD., Tokyo (JP)

( * ) Notice: Subject to any disclaimer, the term of this patent is extended or adjusted under 35 U.S.C. 154(b) by 435 days.

(21) Appl. No.: 17/287,305

(22) PCT Filed: Oct. 16, 2019

(86) PCT No.: PCT/JP2019/040621
§ 371 (c)(1),
(2) Date: Apr. 21, 2021

(87) PCT Pub. No.: WO2020/085161
PCT Pub. Date: Apr. 30, 2020

(65) Prior Publication Data
US 2021/0356355 A1    Nov. 18, 2021

(30) Foreign Application Priority Data

Oct. 22, 2018    (JP) ................................. 2018-198731

(51) Int. Cl.
*G01M 11/02*    (2006.01)
(52) U.S. Cl.
CPC ............................. *G01M 11/0214* (2013.01)
(58) Field of Classification Search
CPC ......... G01M 11/0214; G01M 11/0207; G01M 17/002; G01B 5/0014
See application file for complete search history.

(56) References Cited

U.S. PATENT DOCUMENTS

| 5,138,892 A | 8/1992 | Suga |
| 8,621,945 B2 * | 1/2014 | Zeng ................. G01B 5/0014 73/865.6 |

FOREIGN PATENT DOCUMENTS

| JP | S61-89428 A | 5/1986 |
| JP | H0375542 A | 3/1991 |

(Continued)

OTHER PUBLICATIONS

Aug. 23, 2022 Office Action issued in Japanese Patent Application No. 2018-198731.

(Continued)

*Primary Examiner* — Kristina M Deherrera
*Assistant Examiner* — Jean F Morello
(74) *Attorney, Agent, or Firm* — Oliff PLC

(57) ABSTRACT

An environmental testing laboratory includes a supply port allowing air-conditioned air at a predetermined temperature supplied through the supply port at a predetermined speed, a discharge port facing the supply port and allowing the air be discharged through the discharge port, a flow passage disposed between the supply port and the discharge port and allowing the air to pass through the flow passage part, an installation part disposed at a center of the flow passage and allowing a measurement target in the installation part, and a flow straightening member which is disposed between a sidewall surface of the flow passage part and the installation part and which is configured to straighten an airflow of the air-conditioned air. The sidewall surface of the flow passage part and the first flow straightening member are disposed in parallel with the airflow of the air-conditioned air from the supply port to the discharge port.

10 Claims, 14 Drawing Sheets

(56) References Cited

FOREIGN PATENT DOCUMENTS

| JP | 2000346787 A | 12/2000 |
| JP | 2006-294664 A | 10/2006 |
| JP | 2007003107 A | 1/2007 |
| JP | 2007078286 A | 3/2007 |

OTHER PUBLICATIONS

Jan. 7, 2020 International Search Report issued in International Patent Application No. PCT/JP2019/040621.
Jan. 7, 2020 Written Opinion issued in International Patent Application No. PCT/JP2019/040621.
Toshio, Akatsu. "Present Technologies and Problems of Displacement Sensors for Precision Positioning" Apr. 28, 1993, pp. 329-334.
Terada, Soichi. "Length standard: Effects of Air Refractivity and Vacuum for a Laser Interferometer" Jan. 10, 2009, vol. 52, No. 6, pp. 347-350.

* cited by examiner

ENVIRONMENTAL TESTING CHAMBER AND AIR-CONDITIONING SYSTEM

TECHNICAL FIELD

The present invention relates to an environmental testing laboratory and an air-conditioning system.

BACKGROUND ART

Optical devices for astronomical observation, for example, need nanometer (nm) precision for the measurement of the shape of the lens surface and the dimensions of the structure. A method used for this measurement is typically optical measurement using an optical measurement device such as a laser interferometer.

However, it is known that when a laser interferometer is used in an environment of atmospheric pressure, its measurement is affected by variability due to fluctuations in atmospheric conditions such as temperature, humidity, and pressure (see, for example, Non-patent Literature 1). Thus, to perform optical measurement with high precision, it is a typical practice to perform the measurement after bringing the optical path space to a vacuum to eliminate the influence of the fluctuations in atmospheric conditions such as temperature, humidity, and pressure (see, for example, Non-patent Literature 2).

There has also been proposed stabilizing the measurement environment through air conditioning control so that the measurement may be performed with high precision in an environment of atmospheric pressure (see, for example, Patent Literature 1). For measurement of an optical device, for example, a local space described in Patent Literature 1 is used as an environmental testing laboratory, and optical measurement is performed with a measurement target (a test subject) and an optical measurement device installed in the environmental testing laboratory.

CITATION LIST

Patent Literature

Patent Literature 1: Japanese Patent Application Publication No. 2007-003107

Non-Patent Literature

Non-patent Literature 1: Akatsu, Toshio. "Present Technologies and Problems of Displacement Sensors for Precise Positioning," Kogaku (Japanese Journal of Optics). Vol. 22 No. 6, pp. 329-334, June 1993.
Non-patent Literature 2: Terada, Souichi. "Length Standard: Effects of Air Refractivity and Vacuum for a Laser Interferometer," Journal of the Vacuum Society of Japan, Vol 52 No. 6, pp. 347-350, Jul. 15, 2009.

SUMMARY OF INVENTION

Technical Problem

Fluctuations in atmospheric (air) conditions such as temperature, humidity, and pressure may cause the refractive index of air to fluctuate, causing variability in optical measurement. Conventional environmental testing laboratories consider reducing the fluctuations in atmospheric conditions such as temperature, humidity, and pressure (i.e., stabilizing the atmosphere) in order to perform optical measurement with high precision. However, the inventors of the present invention have found that when there are fluctuations not in atmospheric conditions such as temperature, humidity, and pressure, but in the temperature of a measurement target (a test subject) or an optical measurement device installed in the environmental testing laboratory, their surface shape and structure dimensions change, and it may cause variability in optical measurement. Conventional environmental testing laboratories do not consider reducing the fluctuations in the temperature of a measurement target or an optical measurement device. In such conventional environmental testing laboratories, it is difficult to perform optical measurement with high precision in an environment of atmospheric pressure. Note that fluctuations in the temperature of a measurement target or an optical measurement device are caused by, for example, heat transfer from thermal convection inside the environmental testing laboratory and radiant heat from the walls and the floor.

For example, if the temperature around an environmental testing laboratory is lower than a set temperature of air-conditioned air, the temperature of the wall surfaces of the environmental testing laboratory becomes lower than the set temperature of air-conditioned air. Likewise, for example, if the temperature around the environmental testing laboratory is higher than the set temperature of air-conditioned air, the temperature of the wall surfaces of the environmental testing laboratory becomes higher than the set temperature of air-conditioned air. These differences in temperature can cause thermal convection inside the environmental testing laboratory. Conventional environmental testing laboratories do not have a configuration that takes this thermal convection into consideration. The temperature of the thermal convection is different from the temperature of the air-conditioned air. For this reason, in a conventional environmental testing laboratory, when thermal convection intrudes into the space where a measurement target (a test subject) and an optical measurement device are installed, the temperatures of the measurement target and the optical measurement device change, which can cause variability in optical measurement. While it is expected that a measurement target or an optical measurement device be at the same temperature as the set temperature of air-conditioned air, a difference in temperature between the measurement target and optical measurement device and the wall surfaces of the environmental testing laboratory occurs in the above situation, and due to radiant heat, heat is delivered and received between the measurement target and optical measurement device and the wall surfaces of the environmental testing laboratory. As a result, due to a change in the temperature around the environmental testing laboratory, the temperatures of the measurement target and the optical measurement device change, which may increase the variability in optical measurement. Conventional environmental testing laboratories make no consideration as to stabilizing the temperatures of the measurement target and the optical measurement device so as to avoid changes in the surface shapes and structure dimensions of the measurement target and the optical measurement device. Thus, in such conventional environmental testing laboratories, it is difficult to perform optical measurement with high precision in an environment of atmospheric pressure.

The present invention has been made to solve the problem described above, and has a main object to enable optical measurement to be performed with high precision in an environment of atmospheric pressure.

Solution to Problem

In response to the above issue, an environmental testing laboratory includes a supply port allowing air-conditioned air at a predetermined temperature to be supplied through the supply port at a predetermined flow speed, a discharge port facing the supply port and allowing the air-conditioned air to be discharged through the discharge port, a flow passage part disposed between the supply port and the discharge port and allowing the air-conditioned air to pass through the flow passage part, an installation part disposed at or near a center of the flow passage part and allowing a measurement target for optical measurement to be located in the installation part, and a first flow straightening member which is disposed between a sidewall surface of the flow passage part and the installation part and which is configured to straighten an airflow of the air-conditioned air. The sidewall surface of the flow passage part and the first flow straightening member are disposed in parallel with a direction of the airflow of the air-conditioned air flowing from the supply port to the discharge port.

Other means will be described later.

Advantageous Effects of Invention

The present invention enables optical measurement to be performed with high precision in an environment of atmospheric pressure.

DESCRIPTION OF EMBODIMENTS

Figure 1:
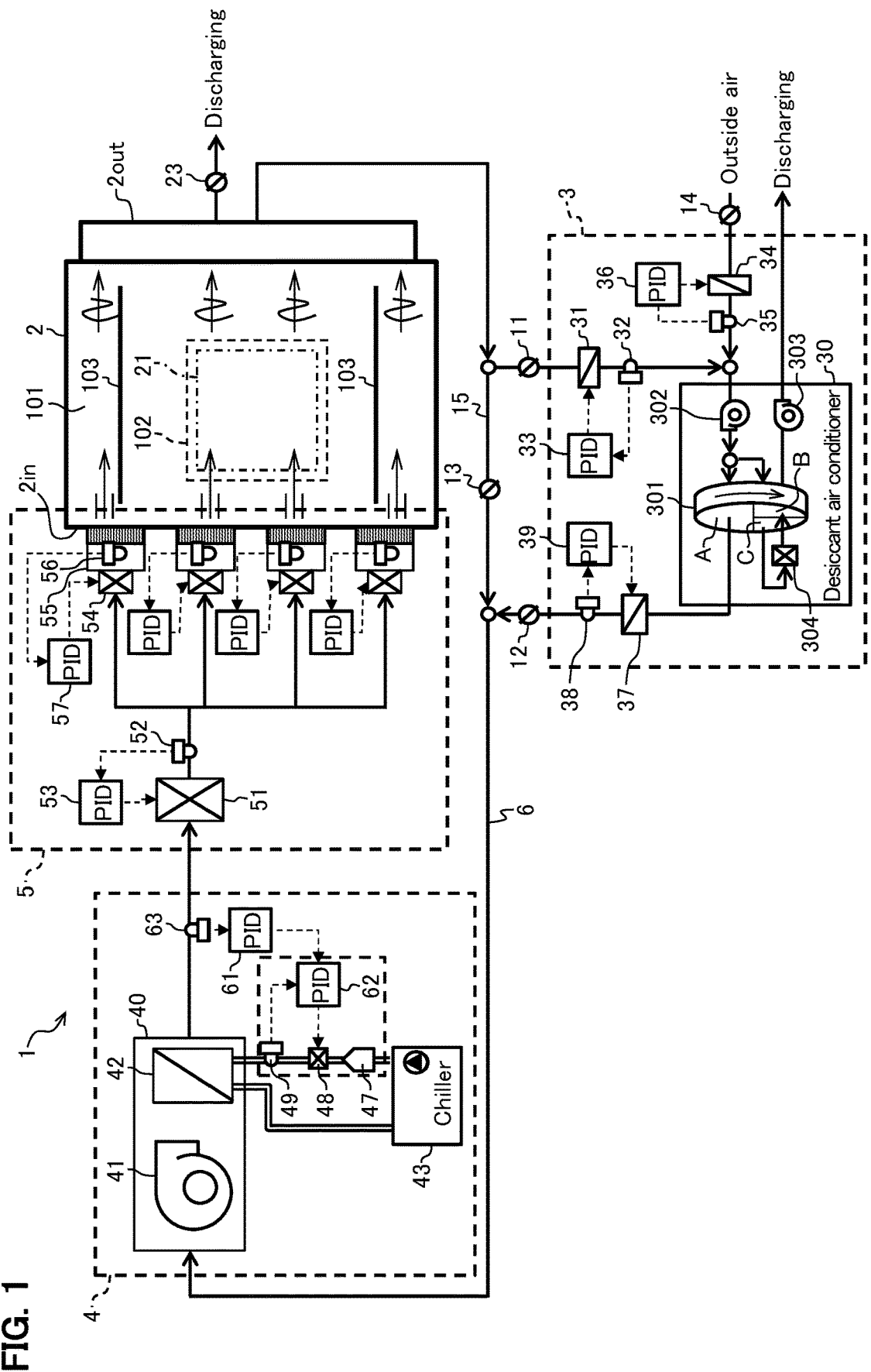
FIG. 1 is a configuration diagram of an entire air conditioning system including an environmental testing laboratory according to Embodiment 1.

With reference to the drawings, embodiments of the present invention (hereinafter referred to as "the present embodiments") are described in detail below. Note that each drawing is illustrated merely schematically to a degree such that the present invention can be understood sufficiently. Thus, the present invention is not limited only to the examples shown. Common or like components are denoted by the same reference numeral throughout the drawings to avoid repetitive descriptions.

Embodiment 1

<Overall Configuration of Air Conditioning System Including Environmental Testing Laboratory>

With reference to FIG. 1, a description is given below on the overall configuration of an air conditioning system including an environmental testing laboratory according to Embodiment 1. FIG. 1 is a configuration diagram of the entire air conditioning system including the environmental testing laboratory according to Embodiment 1.

As shown in FIG. 1, an air conditioning system 1 includes parts such as a dehumidifying part 3, a dry air temperature adjusting part 4, a dry air heating part 5, a circulation flow passage 6, an air blower 41, heaters 51, 54, and heat storages 55. The air conditioning system 1 circulates air-conditioned air in the system by conditioning air discharged from a discharge port tout of an environmental testing laboratory 2 through the circulation flow passage 6 and feeding the conditioned air back to a supply port 2in of the environmental testing laboratory 2.

The dehumidifying part 3 includes a dehumidifier such as a desiccant air conditioner 30, and sends the dry air temperature adjusting part 4 dry air obtained by dehumidifying an air mixture of outside air and air discharged from the environmental testing laboratory 2. The dry air temperature adjusting part 4 adjusts the temperature of the dry air sent from the dehumidifying part 3 to a temperature slightly lower than a set air temperature inside the environmental testing laboratory 2, and sends the dry air heating part 5 the air thus obtained. The dry air heating part 5 heats the dry air sent from the dry air temperature adjusting part 4 up to the set air temperature inside the environmental testing laboratory 2 and sends it into the environmental testing laboratory 2.

The inside of the environmental testing laboratory 2 is insulated from outside air by means of outer walls formed by heat insulation panels or the like. The environmental testing laboratory 2 is supplied only with air which has been air-conditioned by the air conditioning system 1. Provided in a center area of the environmental testing laboratory 2 is an installation part 102 to install a measurement target to be optically measured and an optical measurement device such as a laser interferometer. A vibration isolating base 21 and the like are installed in the installation part 102, and the measurement target and the optical measurement device are placed on the vibration isolating base 21. Details of the environmental testing laboratory 2 will be given in the section titled "Configuration of Environmental Testing Laboratory."

The dry air heating part 5 of the air conditioning system 1 is usually installed over the entirety of a particular side face of the environmental testing laboratory 2 in a distributed manner, and air sent from the dry air heating part 5 flows through the environmental testing laboratory 2 from the side surface where the dry air heating part 5 is installed to the opposite side surface, and most of the air is discharged toward the dehumidifying part 3 and refluxes in the air conditioning system 1, while part of the air is discharged to the outside air. A discharge duct to the outside air is provided with a valve 23 that regulates the amount discharged.

The dehumidifying part 3 includes the desiccant air conditioner 30 as its main component, and the desiccant air conditioner 30 is supplied with a mixture of air discharged from the environmental testing laboratory 2 and outside air, the discharged air and the outside air having been cooled by coolers 31, 34, respectively, down to temperatures suitable for dehumidification. Temperature sensors 32, 35 are provided at the exits of the coolers 31, 34, respectively, and control devices (written as PID in FIG. 1) 33, 36 control the coolers 31, 34, respectively, so that the temperatures detected by the temperature sensors 32, 35 may become predetermined temperatures suitable for dehumidification.

Cooling the air to be supplied to the desiccant air conditioner 30, i.e., air to be dehumidified, with the coolers 31, 34 means not only making the temperature of the air to be dehumidified suitable for dehumidification, but also performing pre-dehumidification. In particular, since outside air is humid, pre-dehumidification of outside air with the cooler 34 can reduce a strain on the desiccant air conditioner 30 for dehumidification.

Although FIG. 1 shows a mode where air discharged from the environmental testing laboratory 2 and outside air are mixed after being cooled by the coolers 31, 34, respectively, air discharged from the environmental testing laboratory 2 and outside air may be mixed first and then cooled by a single cooler.

Air supplied to the desiccant air conditioner 30 (air to be dehumidified) is sent by an air blower 302, and then passes through and is dehumidified in a desiccant rotor 301 that holds a moisture adsorbing substance. What is used as the moisture adsorbing substance held in the desiccant rotor 301 is a moisture adsorbing substance of a high-temperature regenerative type that adsorbs moisture under low temperature and releases moisture under high temperature, such as a polymer adsorbent, silica gel, or zeolite.

The desiccant rotor 301 is shaped like a hollow cylinder, and rotates about the axis of the hollow cylinder in the direction of, for example, the arrow shown in FIG. 1. Most of the air to be dehumidified passes through and gets dehumidified in a region A of the rotating desiccant rotor 301, turns into dry air, and is sent toward the dry air temperature adjusting part 4. Meanwhile, part of the air to be dehumidified passes through a region C of the desiccant rotor 301, is heated by a heater 304, then returns to the desiccant rotor 301, and passes through a region B. In this event, the moisture adsorbing substance held in the region B of the desiccant rotor 301 is exposed to the heated air and consequently regains its moisture adsorbing ability. Meanwhile, the air that has passed through the region B contains a large amount of moisture, and is therefore discharged to the outside of the dehumidifying part 3 (the air conditioning system 1) through an air blower 303.

The desiccant rotor 301 rotates in the direction of the region A→the region B→the region C→the region A→and so on. The region A is where to-be-dehumidified air cooled by the coolers 31, 34 passes, and the region B is where air heated by the heater 304 passes. Thus, as the desiccant rotor 301 rotates, the moisture adsorbing substance held therein adsorbs moisture in the region A, but releases the moisture in the region B, regaining its moisture adsorbing ability.

Part of the cooled to-be-dehumidified air passes through the region C. In this event, the moisture adsorbing substance heated in the region B is cooled down, while the air passing through the region C is heated. Thus, the energy needed by the heater 304 for heating can be saved.

The air passing through the region A of the desiccant rotor 301 increases in temperature. Then, the air that has passed through the region A is cooled by a cooler 37 down to a temperature which is substantially the same as that of the air discharged from the environmental testing laboratory 2. A temperature sensor 38 is provided at the exit of the cooler 37, and the air passing through the cooler 37 is controlled by a control device 39 to maintain a certain temperature.

In the present embodiment, not all the air discharged from the environmental testing laboratory 2 is supplied to the dehumidifying part 3, but part thereof passes through a bypass duct 15, i.e., bypasses the dehumidifying part 3 and flows to the dry air temperature adjusting part 4. This way, out of the air discharged from the environmental testing laboratory 2, only an amount of air necessary to cancel an increase in the humidity that occurred in the environmental testing laboratory 2 can be passed to the dehumidifying part 3. At least after a certain period of time has passed after the air conditioning system 1 starts operating, a rise in humidity in the environmental testing laboratory 2 is small. Thus, bypassing part of the air discharged from the environmental testing laboratory 2 toward the bypass duct 15, a strain on the desiccant rotor 301 for dehumidification can be reduced, and also, the desiccant rotor 301 can be reduced in size.

The amount of air supplied to the dehumidifying part 3 and the amount of air bypassing the dehumidifying part 3 can be regulated by control of the positions of valves 11, 13, respectively. It goes without saying that all of the air discharged from the environmental testing laboratory 2 may be supplied to the dehumidifying part 3 without providing the bypass duct 15.

The humidity of air discharged from the desiccant air conditioner 30 can be set appropriately through adjustment of the temperature in the region B of the desiccant rotor 301, i.e., the heating intensity of the heater 304, the rotation speed of the desiccant rotor 301, the quantity of air from the air blower 302, and the like.

Although the dehumidifying part 3 performs dehumidification using the desiccant air conditioner 30 in the present embodiment, the dehumidification means is not limited to the desiccant air conditioner 30, and may be one that performs dehumidification by, for example, repeating cooling and heating.

Next, the dry air temperature adjusting part 4 is configured including a cooler 42 that uses cold water as a coolant, a chiller 43, a heater 48 that heats cooled-down cold water, and the like. Dry air sent from the dehumidifying part 3 is adjusted in temperature by the cooler 42 to a temperature lower than the set air temperature inside the environmental testing laboratory 2, and is then sent to the dry air heating part 5.

The cooler 42 is provided in a cooling duct 40, and is formed by coil-shaped piping in which cold water as a coolant (hereinafter called coolant water) flows. The coolant water that flows in the cold-water coil is heated by the heater 48 and thereby adjusted in temperature to a predetermined target temperature of coolant water. Then, dry air sent from the dehumidifying part 3 via the air blower 41 is cooled by coming into contact with this cold-water coil, and thereby adjusted in temperature to a predetermined target temperature of dry air (a temperature slightly lower than the set air temperature inside the environmental testing laboratory 2).

Besides the heater 48, a tank 47 is provided on the piping through which the coolant water flows. The tank 47 stores coolant water temporarily and thereby functions to stabilize the temperature of the coolant water.

Thus, the heater 48 is supplied with coolant water with small fluctuations in temperature. Then, the coolant water with small fluctuations in temperature is heated by the heater 48 controlled by control devices 61, 62 and sent to the cooler 42. In this event, the control device 61 compares the air temperature detected by a temperature sensor 63 provided at the exit of the cooling duct 40 with a preset target air temperature, and based on the difference therebetween, computes a target temperature of the coolant water at the exit of the heater 48. Further, the control device 62 compares the temperature of the coolant water detected by a temperature sensor 49 provided at the exit of the heater 48 with the target temperature of the coolant water computed by the control device 61, and based on the difference therebetween, controls the heating intensity of the heater 48.

The dry air heating part 5 is configured including the heaters 51, 54, the heat storages 55, temperature sensors 52, 56, control devices 53, 57, and the like. Dry air supplied from the dry air temperature adjusting part 4 is heated to a predetermined temperature bypassing through the heater 51, and is further heated to a set air temperature preset for the inside of the environmental testing laboratory 2 by passing through the heaters 54 and the heat storages 55 provided on a side surface of the environmental testing laboratory 2.

The heating intensity of the heater 51 is controlled by the control device 53 so that the temperature detected by the temperature sensor 52 provided at the exit of the heater 51 may be constant. Likewise, the heating intensity of each heater 54 is controlled by the control device 57 so that the temperature detected by the temperature sensor 56 which is at the exit of the heat storage 55 may be the same as the set air temperature inside the environmental testing laboratory 2.

A plurality of sets of the heater 54 and the heat storage 55 are provided at the supply port 2 in of the environmental testing laboratory 2. Thus, dry air maintained at a certain temperature is supplied almost evenly to the environmental testing laboratory 2, thereby evening out the temperature of air in the environmental testing laboratory 2.

The heat storage 55 provided downstream of the heater 54 is formed by a porous flow passage member including a large number of hole portions to serve as air flow passages. The heat storage 55 absorbs heat if the temperature of air passing through the hole portions is higher than that of the heat storage 55 itself, and releases heat if the temperature of air passing through the hole portions is lower than that of the heat storage 55 itself. Thus, the heat storage 55 should preferably be one the temperature of which does not fluctuate easily and is usually formed using a material with a large heat capacity or with good thermal conductivity (e.g., metal such as copper or aluminum). This enables efficient reduction of fluctuations in the temperature of dry air sent into the environmental testing laboratory 2 after passing through the hole portions of the heat storage 55.

<Configuration of Environmental Testing Laboratory>

Hereinbelow, first, the configuration of the environmental testing laboratory 2 according to the present embodiment is described with reference to FIGS. 2 and 3, and next, the configuration of an environmental testing laboratory 2Z according to a comparative example is described with reference to FIGS. 4 and 5.

Figure 2:
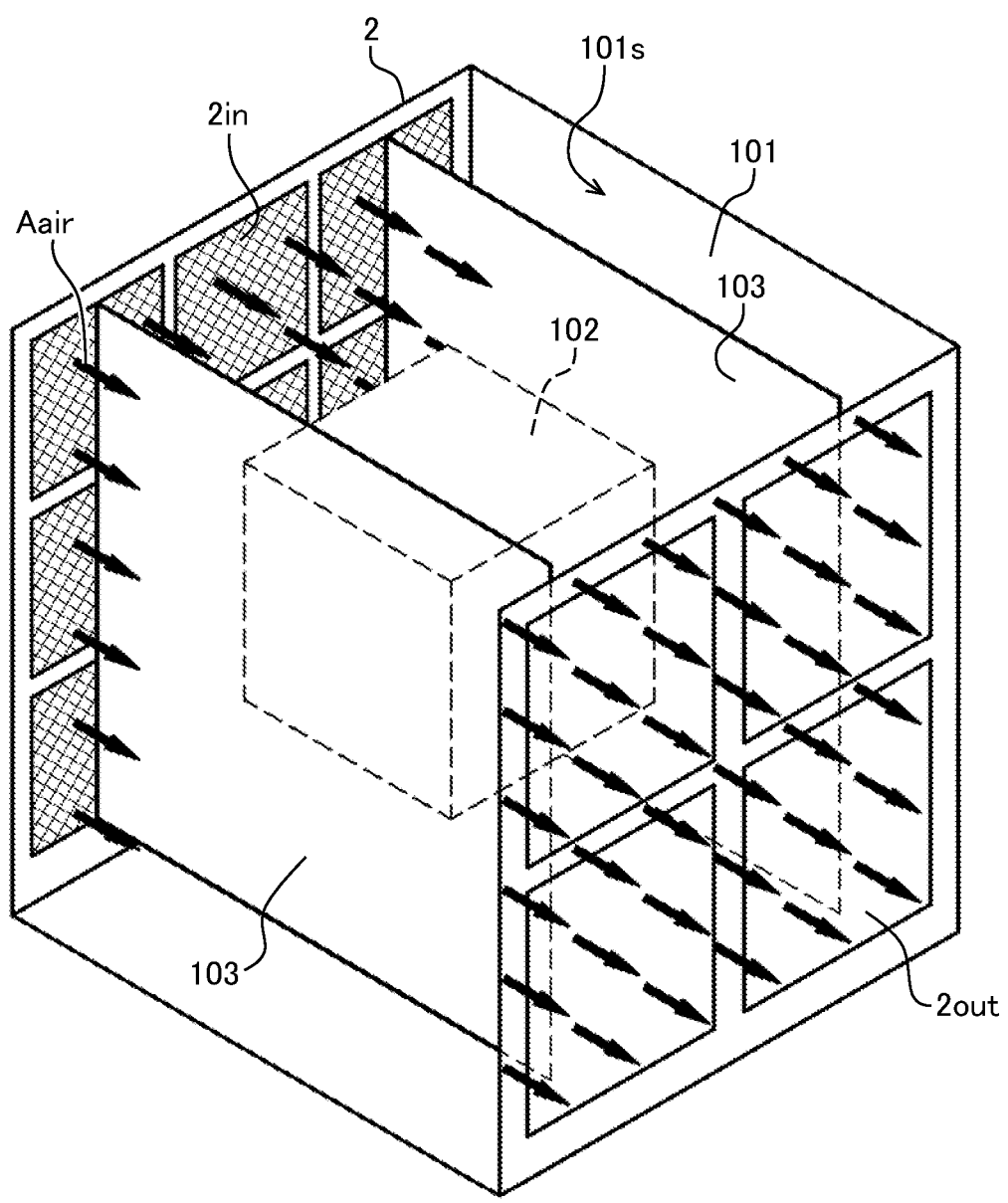
FIG. 2 is a configuration diagram of the environmental testing laboratory according to Embodiment 1.

FIG. 2 is a configuration diagram of the environmental testing laboratory 2 according to Embodiment 1, showing the configuration of the environmental testing laboratory 2 as seen from obliquely above. FIG. 3 is a diagram illustrating thermal convection that occurs inside the environmental testing laboratory 2 according to Embodiment 1, showing the state of the inside of the environmental testing laboratory 2 seen from the back. FIG. 4 is a configuration diagram of the environmental testing laboratory 2Z of the comparative example, showing the configuration of the environmental testing laboratory 2Z as seen from obliquely above. FIG. 5 is a diagram illustrating thermal convection that occurs inside the environmental testing laboratory 2Z of the comparative example, showing the state of the environmental testing laboratory 2Z seen from the back.

The environmental testing laboratory 2 according to the present embodiment (see FIGS. 2 and 3) is a testing laboratory including flow straightening members 103 (see FIGS. 2 and 3) to be described later. By contrast, the environmental testing laboratory 2Z of the comparative example (FIGS. 4 and 5) is a testing laboratory including no flow straightening member 103 (FIGS. 2 and 3) to be described later.

As shown in FIG. 2, the environmental testing laboratory 2 according to the present embodiment has the shape of a hexahedron, and includes the supply port 2in, the discharge port 2out, a flow passage part 101, the installation part 102, and the flow straightening members 103.

The supply port 2in is an opening portion through which air-conditioned air is supplied. The supply port 2in is provided over the entirety of any given face of the hexahedral environmental testing laboratory 2. Air-conditioned air at a predetermined, almost uniform temperature is supplied to the supply port 2in at a predetermined, almost uniform flow speed. The discharge port 2out is an opening portion through which air-conditioned air is discharged. The discharge port 2out is placed over the entirety of a face of the environmental testing laboratory 2 opposite the supply port 2in. The flow passage part 101 is where air-conditioned air inside the environmental testing laboratory 2 passes. The flow passage part 101 is disposed between the supply port 2in and the discharge port 2out. The installation part 102 is where a measurement target TG to be optically measured (a test object) and an optical measurement device such as a laser interferometer are installed. The installation part 102 is disposed at or near the center of the flow passage part 101.

The flow straightening members 103 are members that separate a space where the installation part 102 is provided (hereinafter referred to as a "measurement target space") from the space outside the measurement target space, and also, straighten the airflow of the air-conditioned air flowing in the flow passage part 101. The description below assumes that the flow straightening members 103 are formed by plate-shaped objects. The flow straightening members 103 are disposed respectively on both sides of the installation part 102, i.e., there are a total of two flow straightening members 103. Each flow straightening member 103 is disposed between a sidewall surface 101s of the flow passage part 101 and the installation part 102 in terms of a lateral direction and extends in a depth direction. The flow straightening member 103 is fixed to a ceiling surface 101t (see FIG. 3) and a floor surface 101b (see FIG. 3) of the flow passage part 101 with members such as strings (not shown).

The sidewall surface 101s of the flow passage part 101 and the flow straightening members 103 are disposed in parallel with the direction of the airflow of air-conditioned air flowing from the supply port 2in toward the discharge port tout. In the environmental testing laboratory 2 according to the present embodiment thus configured, the entire face of any given wall is the supply port 2in that blows air-conditioned air out uniformly, and the air-conditioned air is straightened by the sidewall surfaces 101s of the flow passage part 101 and the flow straightening members 103. Thereby, air-conditioned air supplied into the environmental testing laboratory 2 through the supply port 2in is straightened by the flow straightening members 103, travels almost straight toward the discharge port 2out, and is discharged to the circulation flow passage 6 (see FIG. 1) through the discharge port 2out (see arrows Aair). Thus configured, the environmental testing laboratory 2 according to the present embodiment can control the airflow of air-conditioned air so that unintended transfer of heat to the measurement target TG or the optical measurement device may not occur to cause fluctuations in the temperatures of the measurement target TG and the optical measurement device.

Figure 3:
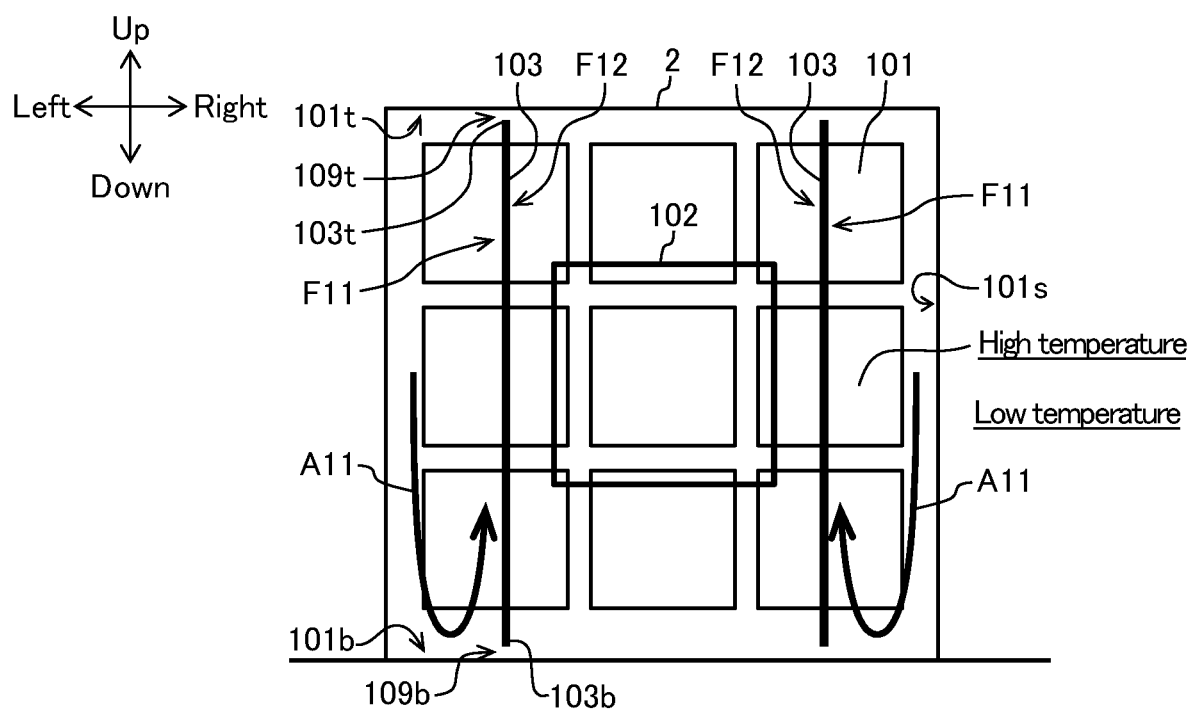
FIG. 3 is a diagram illustrating thermal convection occurring inside the environmental testing laboratory according to Embodiment 1.

For example, in a case where the temperature around the environmental testing laboratory 2 is lower than a set temperature of air-conditioned air as shown in FIG. 3, the temperature of the wall surfaces of the environmental testing laboratory 2 becomes lower than that of the air-conditioned air. This difference in temperature may cause thermal convection inside the environmental testing laboratory 2. This thermal convection tries to intrude into the installation part 102 by going around from lower portions of the environmental testing laboratory 2. The temperature of this thermal convection is different from that of the air-conditioned air. For this reason, once the thermal convection intrudes into the installation part 102, heat may be transferred from the thermal convection to the measurement target TG and the optical measurement device, causing fluctuations in the temperatures of the measurement target TG and the optical measurement device.

For example, in a case opposite from the example shown in FIG. 3, i.e., a case where the temperature around the environmental testing laboratory 2 is higher than the set temperature of air-conditioned air, the temperature of the wall surfaces of the environmental testing laboratory 2 becomes higher than that of the air-conditioned air. This difference in temperature too may cause thermal convection inside the environmental testing laboratory 2. This thermal convection tries to intrude into the installation part 102 by going around from upper portions of the environmental testing laboratory 2, which is the opposite direction of that in the example shown in FIG. 3. The temperature of this thermal convection in this case is also different from that of the air-conditioned air. For this reason, once the thermal convection intrudes into the installation part 102, heat may be transferred from the thermal convection to the measurement target TG and the optical measurement device, causing fluctuations in the temperatures of the measurement target TG and the optical measurement device.

To address this, the environmental testing laboratory 2 according to the present embodiment includes the flow straightening members 103 inside as members to help prevent intrusion of thermal convection into the installation part 102. Thus configured, the environmental testing laboratory 2 according to the present embodiment can help prevent thermal convection from intruding into the installation part 102 by use of the flow straightening members 103 (see arrows A11). Since the environmental testing laboratory 2 according to the present embodiment thus prevents thermal convection from reaching the installation part 102, the measurement target TG and the optical measurement device installed in the installation part 102 can maintain certain temperatures. As a result, the environmental testing laboratory 2 according to the present embodiment can perform optical measurement with high precision in an environment of atmospheric pressure.

Figure 4:
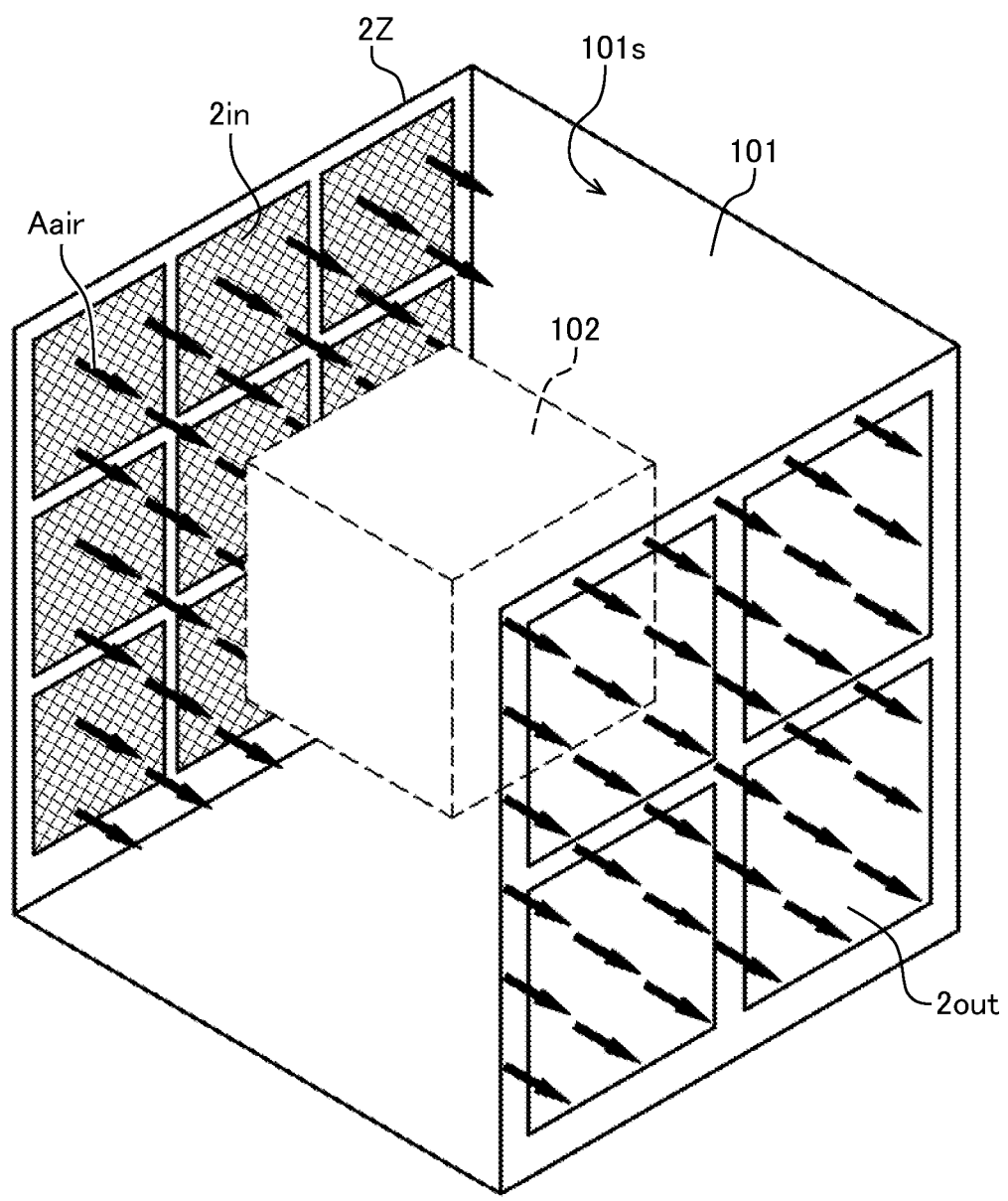
FIG. 4 is a configuration diagram of an environmental testing laboratory of a comparative example.
Figure 5:
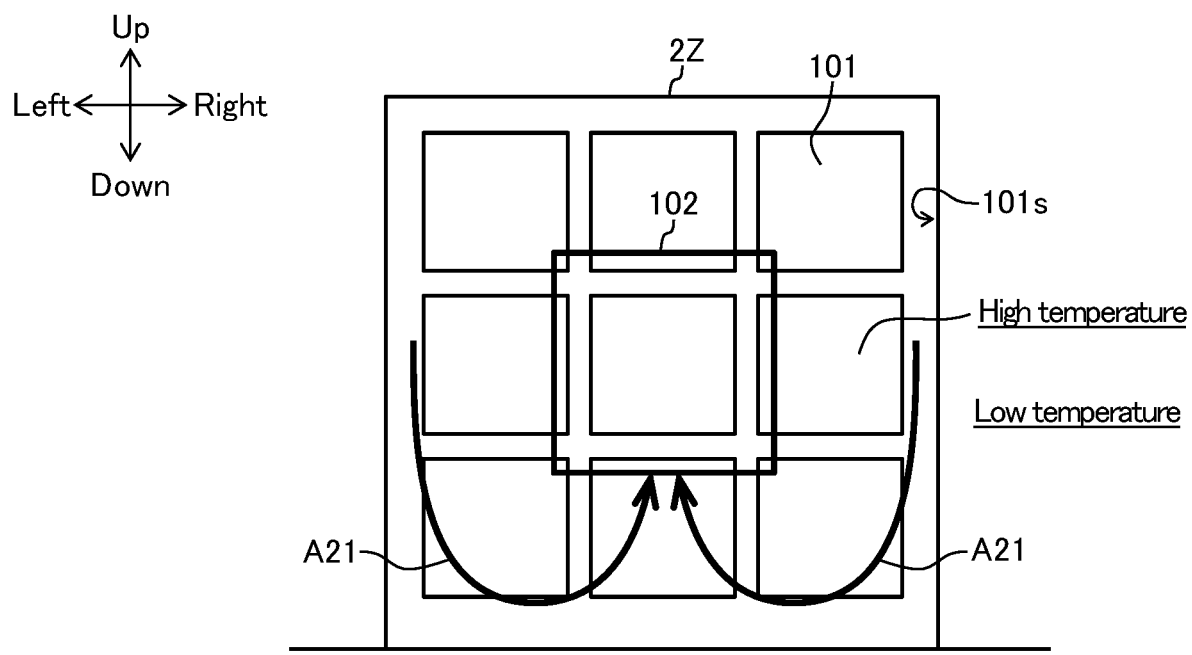
FIG. 5 is a diagram illustrating thermal convection occurring inside the environmental testing laboratory according to the comparative example.

By contrast, as shown in FIGS. 4 and 5, the environmental testing laboratory 2Z of the comparative example does not include the flow straightening members 103 (FIGS. 2 and 3). Thus, as shown in FIG. 5, in the environmental testing laboratory 2Z of the comparative example, thermal convection tries to intrude into the installation part 102 by going around (see arrows A21). The temperature of thermal convection is different from that of the air-conditioned air. For this reason, once the thermal convection intrudes into the installation part 102, heat may be transferred from the thermal convection to the measurement target TG and the optical measurement device, causing fluctuations in the temperatures of the measurement target TG and the optical measurement device. It is therefore difficult for the environmental testing laboratory 2Z of the comparative example to perform optical measurement with high precision in an environment of atmospheric pressure. Hence, the environmental testing laboratory 2 according to the present embodiment has a configuration more suitable for optical measurement with high precision in an environment of atmospheric pressure than the environmental testing laboratory 2Z of the comparative example.

<Example of How Measurement Target is Disposed in Environmental Testing Laboratory>

Figure 6:
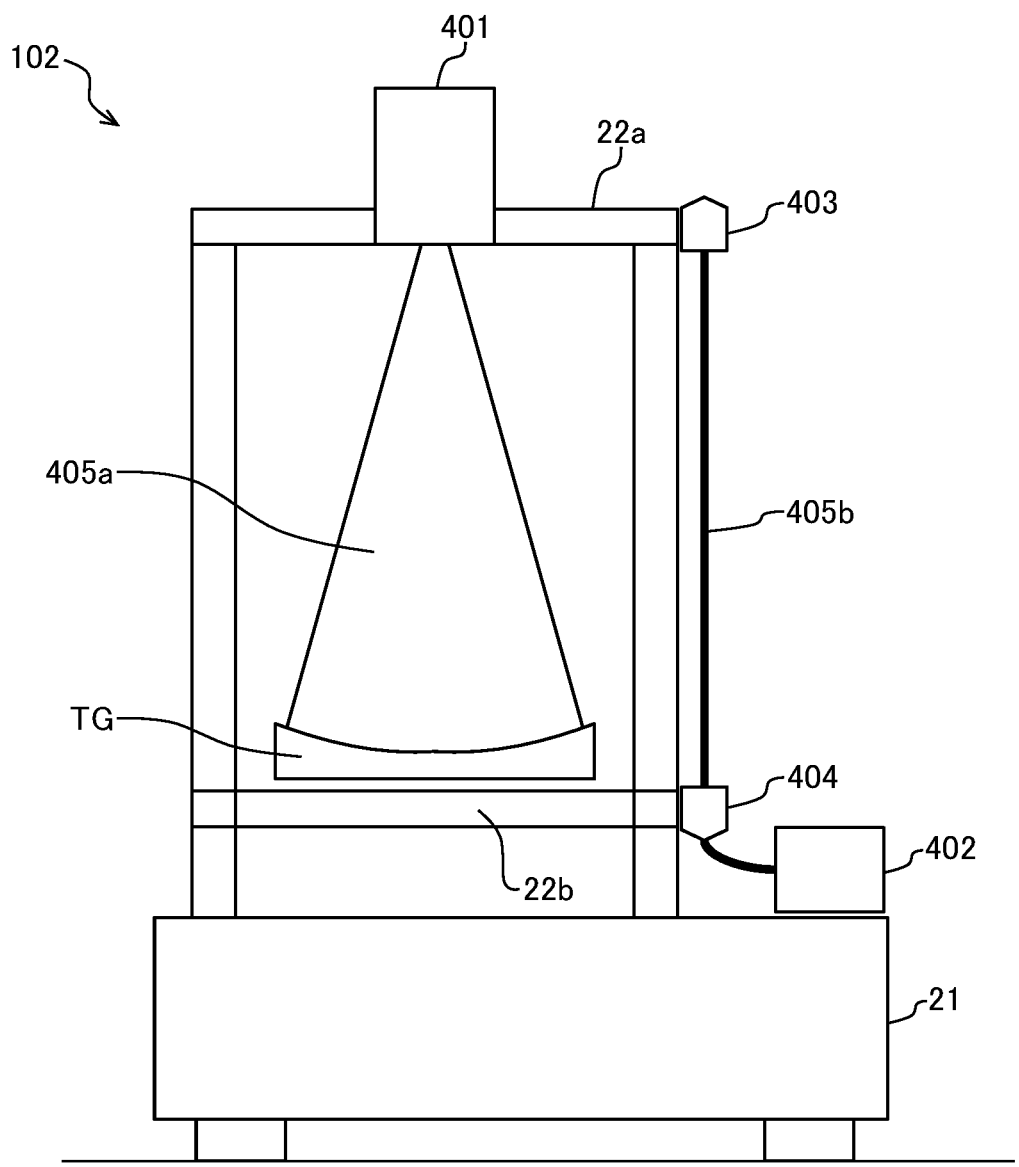
FIG. 6 is a diagram illustrating an example of how a measurement target is disposed in the environmental testing laboratory.

With reference to FIG. 6, a description is given below on an example of how the measurement target TG is disposed in the environmental testing laboratory 2 according to the present embodiment. FIG. 6 is a diagram illustrating an example of how the measurement target TG is disposed in the environmental testing laboratory 2. However, the example shown in FIG. 6 is merely an example, and the type, disposition position, and the like of the optical measurement device used can be changed as necessary according to the operation.

As shown in FIG. 6, the vibration isolating base 21 is installed in the installation part 102 in the environmental testing laboratory 2, and on the vibration isolating base 21, the measurement target TG, a phase-shifting interferometer 401, and a Michelson interferometer 402 are placed.

In the example shown in FIG. 6, the phase-shifting interferometer 401 is placed on, for example, a base 22a and is disposed above the measurement target TG. The measurement target TG is placed on a base 22b and is disposed below the phase-shifting interferometer 401. A reflector 403 is attached to the base 22a, and a sensor head 404 is attached to the base 22b. The sensor head 404 is connected to the Michelson interferometer 402. The phase-shifting interferometer 401 irradiates the measurement target TG with light 405a to measure the surface shape of the measurement target TG. The Michelson interferometer 402 measures the change in the distance between the sensor head 404 and the reflector 403 by using light 405b applied from the sensor head 404 to the reflector 403 and reflected.

<Factors Affecting Variability in Optical Measurement>

Figure 7:
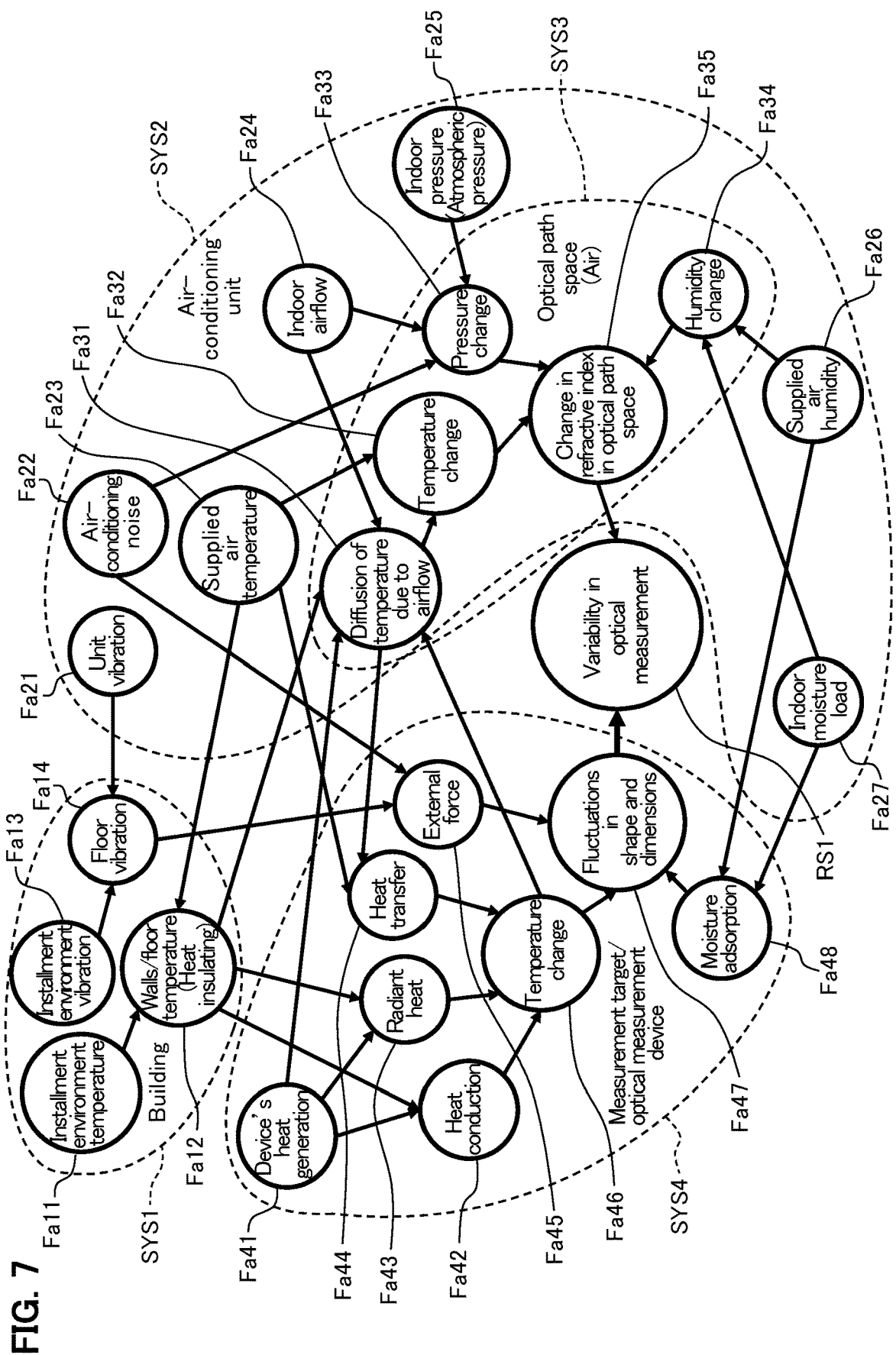
FIG. 7 is a diagram illustrating factors causing variability in optical measurement.

The environmental testing laboratory 2 according to the present embodiment aims to reduce variability in optical measurement. The factors shown in FIG. 7 are examples of factors affecting the variability in optical measurement. With reference to FIG. 7, a description is given below on factors affecting the variability in optical measurement. FIG. 7 is a diagram illustrating factors affecting variability in optical measurement.

As shown in FIG. 7, factors affecting variability in optical measurement (RS1) include a building (SYS1), air-conditioning unit (SYS2), measurement target/optical measurement device (SYS4), and the like. The air-conditioning unit (SYS2) includes optical path space (air) (SYS3). The breakdowns of these factors are specifically as follows.

The factor "building (SYS1)" includes installment environment temperature (Fa11), walls/floor temperatures (heat insulating performance of the walls and floor) (Fa12), installment environment vibration (Fa13), floor vibration (Fa14), and the like.

The factor "air-conditioning unit (SYS2)" includes unit vibration (Fa21), air-conditioning noise (Fa22), supplied air temperature (Fa23), indoor airflow (Fa24), indoor pressure (atmospheric pressure) (Fa25), supplied air humidity (Fa26), indoor moisture load (Fa27), and the like.

The factor "optical path space (air) (SYS3)" includes diffusion of temperature due to airflow (Fa31), temperature change (Fa32), pressure change (Fa33), humidity change (Fa34), change in refractive index in optical path space (Fa35), and the like.

The factor "measurement target/optical measurement device (SYS4)" includes device's heat generation (Fa41), heat conduction (Fa42), radiant heat (Fa43), heat transfer (Fa44), external force (Fa45), temperature change (Fa46), fluctuations in shape and dimensions (Fa47), moisture adsorption (Fa48), and the like.

These factors affect one another, for example, as depicted by the arrows shown in FIG. 7. Note that the aforementioned "heat conduction (Fa42)" means travel of heat conducted through a solid substance. The "radiant heat (Fa43)" means travel of heat radiated from the surface of a solid substance. The "heat transfer (Fa44)" means travel of heat conducted through air.

The environmental testing laboratory 2 according to the present embodiment suppresses (mitigates) the factor "diffusion of temperature due to airflow (Fa31)" by use of the flow straightening members 103. As a result, the environmental testing laboratory 2 according to the present embodiment can mitigate the influence on the "variability in optical measurement (RS1)" caused in the following route (a) and route (b).

(a) Walls/floor temperatures (Fa12)→diffusion of temperature due to airflow (Fa31)→temperature change (Fa32) change in refractive index in optical path space (Fa35).

(b) Walls/floor temperatures (Fa12)→diffusion of temperature due to airflow (Fa31)→heat transfer (Fa44)→temperature change (Fa46)→fluctuations in shape and dimensions (Fa47).

Using the flow straightening members 103, the environmental testing laboratory 2 according to the present embodiment also suppresses (mitigates) the influence of the factor "radiant heat (Fa43)" on the factor "temperature change (Fa46)" of the measurement target/optical measurement device (SYS4). As a result, the environmental testing laboratory 2 according to the present embodiment can mitigate the influence on the "variability in optical measurement (RS1)" caused in the following route (c).

(c) Walls/floor temperatures (Fa12)→radiant heat (Fa43)→temperature change (Fa46)→fluctuations in shape and dimensions (Fa47).

As such, the environmental testing laboratory 2 according to the present embodiment can relatively enhance (improve) the influence on the "variability in optical measurement (RS1)" caused in the following route (d). As a result, the temperatures of the measurement target/optical measurement device (SYS4) can be stabilized.

(d) Supplied air temperature (Fa23)→heat transfer (Fa44)→temperature change (Fa46)→fluctuations in shape and dimensions (Fa47).

<Supplementary Notes Regarding Environmental Testing Laboratory According to Present Embodiment>

The environmental testing laboratory 2 according to the present embodiment takes the following points into account.

In the environmental testing laboratory 2 according to the present embodiment, it is preferable that the heat distribution in the entire space of the installation part 102 is kept within ±0.5° C. The flow straightening members 103 of the environmental testing laboratory 2 according to the present embodiment may be preferably made of a material with a small heat capacity. For example, the heat capacity of the flow straightening member 103 may be 2000 (J/m$^2$·K) or below. Consequently, in the environmental testing laboratory 2 according to the present embodiment, the flow straightening members 103 can adapt to the ambient temperature fast, and therefore the heat distribution in the measurement target space (the space where the installation part 102 is provided) can easily converge to a small value. As a result, in the environmental testing laboratory 2 according to the present embodiment, the heat distribution in the entire space of the installation part 102 can be easily kept within ±0.5° C. If the heat distribution in the entire space of the installation part 102 is kept within ±0.5° C., the heat distribution of the measurement target TG and the optical measurement device placed in the installation part 102 is also kept within ±0.5° C. ultimately.

Grounds for setting the heat capacity of the flow straightening member 103 to 2000 (J/m$^2$·K) or below are as follows. Specifically, on the assumption that the heat transfer coefficient of the flow straightening member 103 is, for example, 5 (W/m$^2$·K), which is standard, if the heat capacity of the flow straightening member 103 is 2000 (J/m$^2$·K) or below, the time constant of the flow straightening member 103 is 400 (s) or below. In a case where the measurement target TG is an optical device used for astronomical observation, the above time constant is sufficiently (e.g., by approximately one digit) smaller than the time constants required of the measurement target TG and an optical measurement device used for the measurement of the measurement target TG. Thus, if the heat capacity of the flow straightening member 103 is 2000 (J/m$^2$·K) or below, the flow straightening members 103 come close to the temperature of air-conditioned air faster than the measurement target TG and the optical measurement device and therefore do not hinder measurement. For this reason, the heat capacity of the flow straightening member 103 is preferably 2000 (J/m$^2$·K) or below.

Further, as shown in FIG. 3, a radiant heat insulating material having a specular reflection surface F11 and a diffuse reflection surface F12 may preferably be used as a material for the flow straightening member 103. Then, the flow straightening members 103 may be installed in such a manner that its surface facing the sidewall surface 101s of the flow passage part 101 (the environmental testing laboratory 2) is the specular reflection surface F11 and the surface not facing it is the diffuse reflection surface F12. This way, the environmental testing laboratory 2 according to the present embodiment can suppress heat transfer due to radiant heat from the sidewall surface 101s to the measurement target TG placed in the installation part 102. Thus configured, the environmental testing laboratory 2 according to the present embodiment can make the temperature of the space between the flow straightening members 103 almost uniform. Thus, in the environmental testing laboratory 2 according to the present embodiment, the heat distribution in the measurement target space can easily converge to a small value. As a result, the environmental testing laboratory 2 according to the present embodiment can easily keep the heat distribution in the entire space in the installation part 102 within ±0.5° C.

The environmental testing laboratory 2 according to the present embodiment has a structure such that the flow straightening members 103 are each supported by the ceiling surface 101*t* and the floor surface 101*b* of the flow passage part 101 only at support portions provided at any given positions, and not supported at portions other than the support portions. In other words, as shown in FIG. 3, the environmental testing laboratory 2 according to the present embodiment has a structure such that, at portions other than the support portions, a small gap 109*t* is provided between an upper edge portion 103*t* of the flow straightening member 103 and the ceiling surface 101*t* of the flow passage part 101. Also, the environmental testing laboratory 2 according to the present embodiment has a structure such that, at portions other than the support portions, a small gap 109*b* is provided between the lower edge portion 103*b* of the flow straightening member 103 and the floor surface 101*b* of the flow passage part 101. This structure is employed to reduce the area of contact of the flow straightening member 103 with the ceiling surface 101*t* and the floor surface 101*b* of the flow passage part 101 (the environmental testing laboratory 2) so that as small an amount of heat as possible may be conducted from the flow passage part 101 (the environmental testing laboratory 2) to the flow straightening member 103 to suppress fluctuations in the temperature of the flow straightening member 103.

Preferably, the sizes of the gap 109*t* and the gap 109*b* may be each approximately 1% of the height of the internal space of the environmental testing laboratory 2. Thus, the environmental testing laboratory 2 may be structured so that each flow straightening member 103 which has a height approximately 98% of the height of the internal space of the environmental testing laboratory 2 is disposed with the gap 109*t* and the gap 109*b* being provided at the top and the bottom thereof. The width, height, and depth of the internal space of the environmental testing laboratory 2 are each, for example, approximately several meters (m) to several tens of meters (m).

To perform optical measurement with high precision in an environment of atmospheric pressure, it is generally important to stabilize the refractive index of air-conditioned air passing through the installation part 102 by stabilizing the temperature and humidity of the air-conditioned air and to suppress deformation of the measurement target TG due to thermal expansion by stabilizing the temperature of the measurement target TG. In this respect, the temperature and humidity of air-conditioned air supplied from the outside of the environmental testing laboratory 2 can be stabilized by the heaters 51, 54, the heat storages 55, and the like (see FIG. 1). However, when there is temperature diffusion from the surrounding sidewall surfaces 101*s* and floor surface or there is a difference in temperature between the measurement target TG and air-conditioned air, the temperature and humidity of air-conditioned air passing through the installation part 102 fluctuate by being affected by temperature diffusion from the measurement target TG. Thus, in order to stabilize the temperature of the installation part 102, it is preferable that the environmental testing laboratory 2 not only controls the speed of air-conditioned air, but also prevents temperature diffusion from the surrounding environment such as the sidewall surfaces 101*s* and the floor surface and reduces the difference in temperature between the measurement target TG and the air-conditioned air.

A conceivable method to stabilize the temperature of the measurement target TG is heating/cooling control using a heater, a cooling jacket, and the like, but a method employed in the present embodiment is leveling (evening) out the temperature of the measurement target TG by means of heat transfer between the measurement target TG and air-conditioned air controlled to a certain temperature. This method is effective when the measurement target TG generates no heat or little heat. Advantages of this method include, for example, reliably stabilizing the temperature over time, being able to reduce the temperature distribution inside the measurement target TG unlike local heating/cooling, and being able to reduce the difference in temperature between the measurement target TG and air-conditioned air and to stabilize the temperature of air-conditioned air passing through the installation part 102.

In the environmental testing laboratory 2 according to Embodiment 1, the speed of airflow in the flow passage part 101 is set so that velocity components perpendicular to the sidewall surfaces 101*s* and the floor surface may be small to reduce the convective diffusion of temperature from the sidewall surface 101*s* and the floor surface. In the environmental testing laboratory 2, the supply port 2in is provided over the entirety of any given face, and the discharge port 2out is provided over the entirety of a face opposite the supply port 2in. Air-conditioned air at a predetermined, almost uniform temperature is supplied to the supply port 2in at a predetermined, almost uniform flow speed. The airflow of this air-conditioned air travels in parallel with the sidewall surfaces 101*s* and the floor surface of the flow passage part 101 formed inside the environmental testing laboratory 2. Thus, an airflow formed in the flow passage part 101 is substantially in one direction. This airflow has small velocity components perpendicular to the floor surface and the sidewalls provided with no supply port 2in or discharge port 2out, and therefore there is only small convective diffusion of temperature from the sidewall and floor surfaces. Also, this airflow collides with the measurement target uniformly, and does not really stagnate around the measurement target TG. This airflow uniformly transfers heat to the entire measurement target TG and is therefore effective in leveling out the temperature of the entire measurement target TG.

The environmental testing laboratory 2 according to Embodiment 1 includes the flow straightening members 103 which are each parallel with the airflow direction and provided between the sidewall surface 101*s* and the installation part 102 provided at or near the center of the environmental testing laboratory 2. Thermal convection occurs when there is a temperature difference between the sidewall surface 101*s* and air-conditioned air, but the environmental testing laboratory 2 according to Embodiment 1 can prevent the thermal convection from intruding into the installation part 102 by use of the flow straightening members 103. Also, by use of the flow straightening members 103, the environmental testing laboratory 2 according to Embodiment 1 can prevent the airflow around the measurement target TG from diffusing away from the measurement target TG, and promote heat transfer between the measurement target TG and air-conditioned air.

Desirably, the flow straightening members 103 each have a temperature close to the temperature of air-conditioned air.

Thus, heat conduction from the walls and floor to the flow straightening member 103 should be low, and the heat capacity of the flow straightening member 103 should be small.

The temperature of the measurement target TG is affected also by radiant heat from the wall and floor surfaces of the environmental testing laboratory 2. Thus, the flow straightening members 103 are each desirably formed of a radiant heat insulating material having the specular reflection surface F11 facing the wall surface of the environmental testing laboratory 2. When formed of a radiant heat insulating material, the flow straightening member 103 is less affected by the radiant heat from the wall surfaces of the environmental testing laboratory 2 and allows the difference in temperature between the measurement target TG and air-conditioned air to be small. As a result, fluctuations in the temperature of the measurement target TG caused by fluctuations in the temperature of the wall surfaces of the environmental testing laboratory 2 can be reduced.

The temperature of such flow straightening member 103 is desirably close to the temperature of air-conditioned air; thus, the surface facing a wall surface of the environmental testing laboratory 2 is preferably the specular reflection surface F11. It should be noted that when an optical measurement device such as a laser interferometer is used in the environmental testing laboratory 2, irregular reflection of laser light can occur. Thus, the surface of each flow straightening member 103 facing the measurement target TG is preferably the diffuse reflection surface F12.

The environmental testing laboratory 2 according to Embodiment 1 is capable of stabilizing the refractive index of air in the measurement space and the temperature of the measurement target and providing a measurement target installment environment that enables optical measurement with high precision in an environment of atmospheric pressure.

As described, the environmental testing laboratory 2 according to Embodiment 1 enables optical measurement with high precision in an environment of atmospheric pressure.

Embodiment 2

The flow straightening members 103 of the environmental testing laboratory 2 according to Embodiment 1 (see FIG. 2) are formed by plate-shaped objects. In an environmental testing laboratory 2A provided as Embodiment 2, the flow straightening members are formed by curtains 103A made of cloth.

Figure 8:
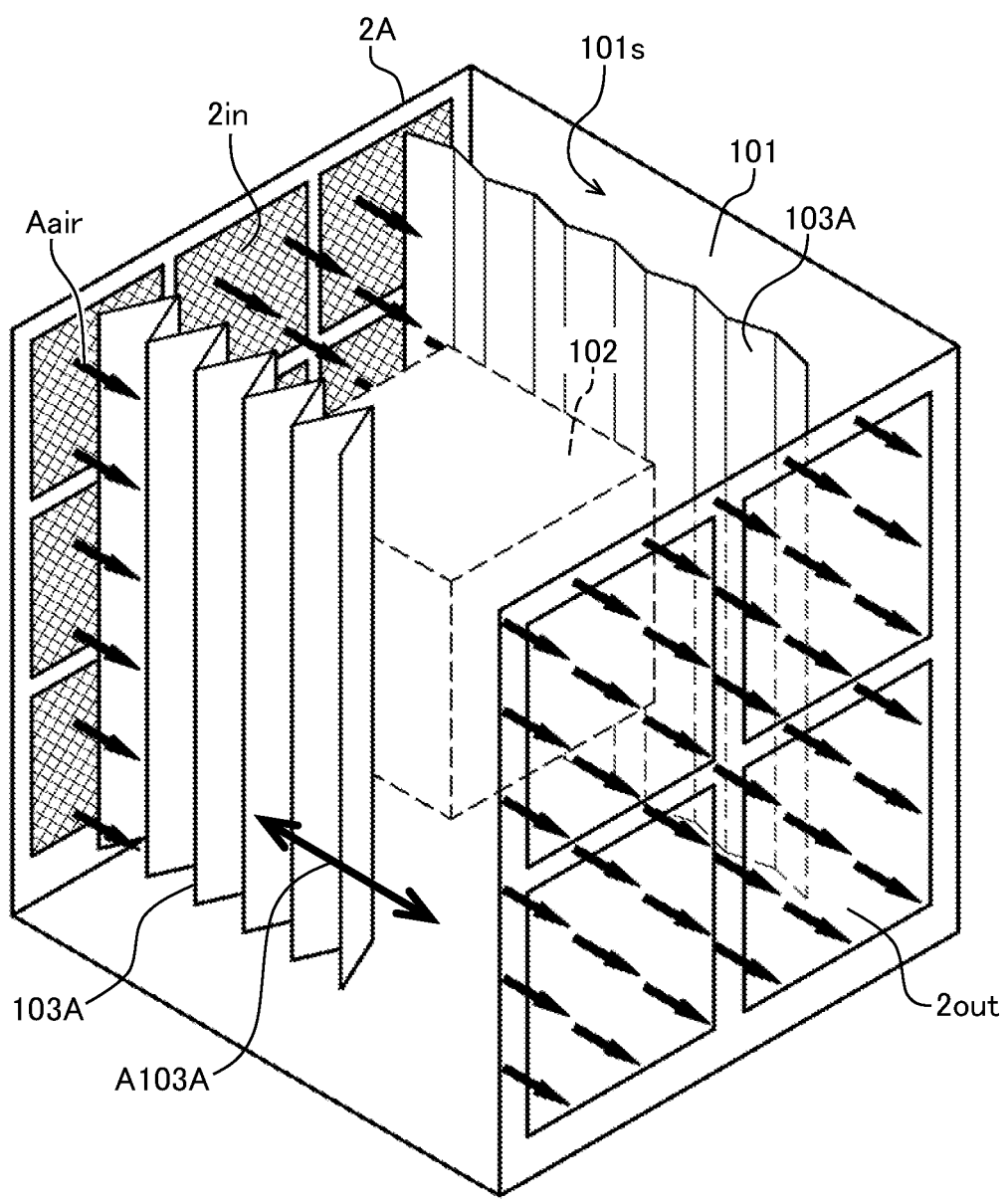
FIG. 8 is a configuration diagram (1) of an environmental testing laboratory according to Embodiment 2.
Figure 9:
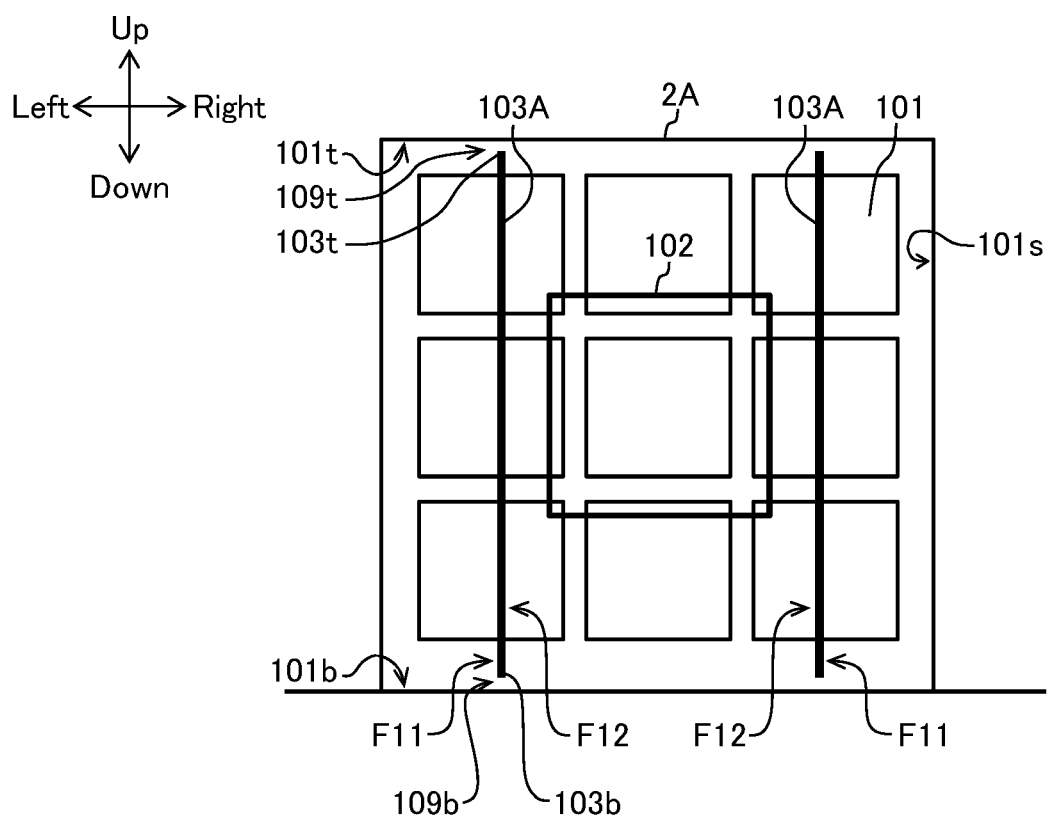
FIG. 9 is a configuration diagram (2) of the environmental testing laboratory according to Embodiment 2.

With reference to FIGS. 8 and 9, a description is given below on the configuration of the environmental testing laboratory 2A according to Embodiment 2. FIGS. 8 and 9 are each a configuration diagram of the environmental testing laboratory 2A according to Embodiment 2.

As shown in FIG. 8, the environmental testing laboratory 2A according to Embodiment 2 differs from the environmental testing laboratory 2 according to Embodiment 1 (see FIG. 2) in having the cloth curtains 103A as flow straightening members in place of the flow straightening members 103.

The curtains 103A are configured to be able to be developed and folded in the directions of arrows A103A. Thus, the environmental testing laboratory 2A according to Embodiment 2 makes installment of the measurement target TG and the optical measurement device into the installation part 102 easier than the environmental testing laboratory 2 according to Embodiment (see FIG. 2).

As shown in FIG. 9, in the environmental testing laboratory 2A according to Embodiment 2, like in the environmental testing laboratory 2 according to Embodiment 1, a small gap 109t is provided between the upper edge portion 103t of each curtain 103A serving as a flow straightening member and the ceiling surface 101t of the flow passage part 101. Likewise, a small gap 109b is provided between the lower edge portion 103b of each curtain 103A serving as a flow straightening member and the floor surface 101b of the flow passage part 101. The gaps are provided to, like in the environmental testing laboratory 2 according to Embodiment 1, reduce the area of contact of the curtains 103A with the ceiling surface 101t and the floor surface 101b of the flow passage part 101 (the environmental testing laboratory 2A) in order to reduce the amount of heat conducted from the flow passage part 101 (the environmental testing laboratory 2A) to the curtains 103A as much as possible and to reduce fluctuations in the temperature of the flow straightening members 103 curtains 103A. The curtains 103A may be loosely fixed so that they can be developed and folded in the directions of arrows A103A (see FIG. 8).

As shown in FIGS. 10A to 10D, each curtain 103A may be configured to be suspended at its upper side with a suspension member 151. Also, as shown in FIG. 11A to 11C, the curtain 103A may be configured so that its lower side may be secured by use of a hook portion 161 and the like.

Figure 10A:
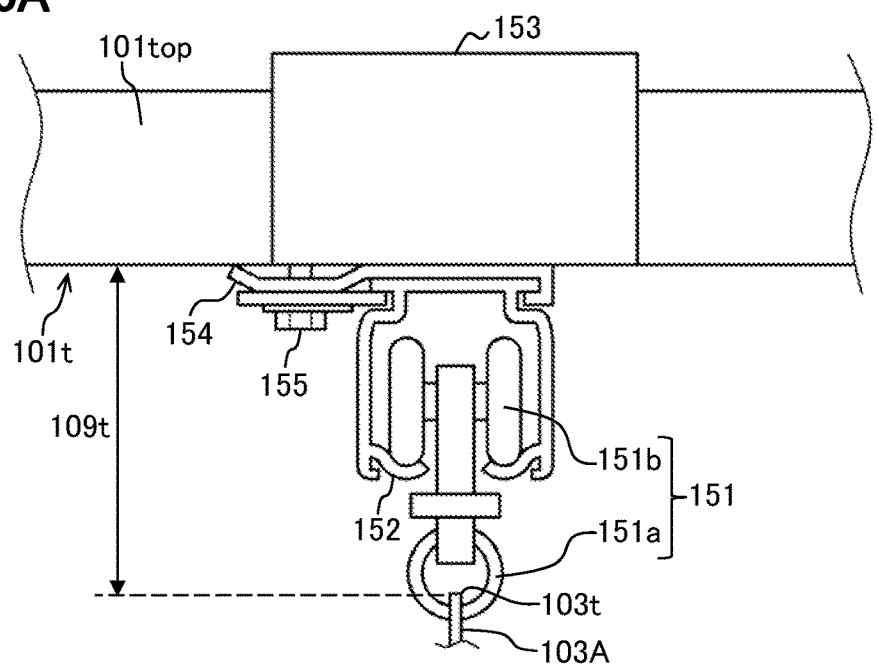
FIG. 10A is a configuration diagram of a suspension member and a curtain rail for suspending a curtain.
Figure 10B:
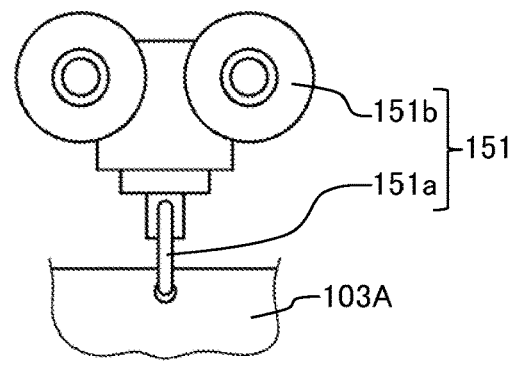
FIG. 10B is a configuration diagram of the suspension member.
Figure 10C:
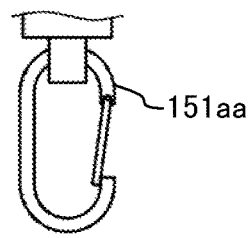
FIG. 10C is a configuration diagram of a modification of the suspension member.
Figure 10D:
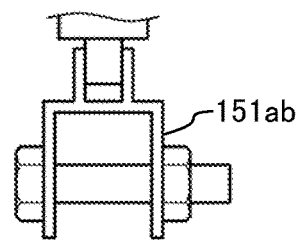
FIG. 10D is a configuration diagram of another modification of the suspension member.
Figure 11A:
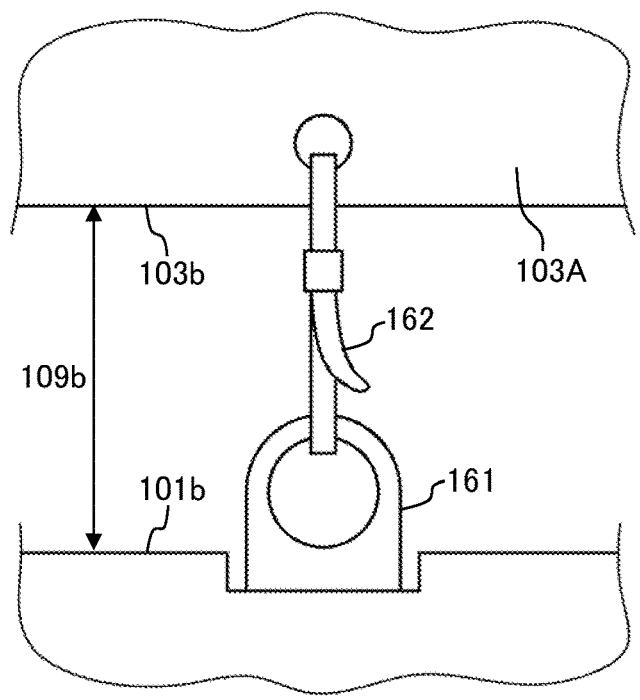
FIG. 11A is a configuration diagram of a hook portion and a rubber band that secure the curtain.
Figure 11B:
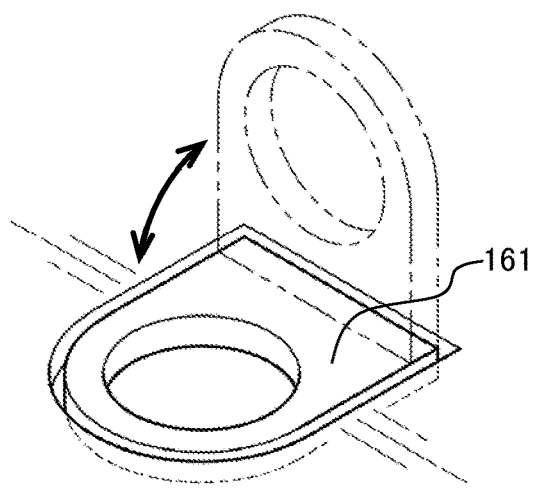
FIG. 11B is a configuration diagram of the hook portion.
Figure 11C:
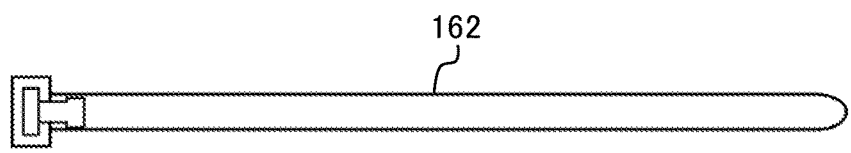
FIG. 11C is a configuration diagram of the rubber band.

FIG. 10A is a configuration diagram of the suspension member 151 and a curtain rail 152 for suspending the curtain 103A. FIG. 10B is a configuration diagram of the suspension member 151. FIG. 10C is a configuration diagram of a modification of the suspension member 151. FIG. 10D is a configuration diagram of another modification of the suspension member 151. FIG. 11A is a configuration diagram of the hook portion 161 and a rubber band 162 for securing the curtain 103A. FIG. 11B is a configuration diagram of the hook portion 161. FIG. 11C is a configuration diagram of the rubber band 162.

As shown in FIG. 10A, the ceiling surface 101t of the flow passage part 101 (the environmental testing laboratory 2A) is provided with the curtain rail 152in which the suspension member 151 to suspend the curtain 103A is fitted to slide therein. A support steel material 153 is attached to a ceiling panel 101top of the flow passage part 101 (the environmental testing laboratory 2A). A bracket 154 is attached to this support steel material 153 with a bolt (or screw) 155. The curtain rail 152 is secured and supported by the bracket 154.

The curtain rail 152 supports the suspension member 151 in such a manner that the suspension member 151 can move freely. In the example shown in FIGS. 10A and 10B, the suspension member 151 has a ring-shaped support portion 151a that engages with a hole provided at an upper edge portion of the curtain 103A and runners 151b that move in the curtain rail 152. As shown in FIG. 10A, an upper edge portion of the curtain 103A suspended by the suspension member 151 is disposed at a position away from the ceiling surface 101t of the flow passage part 101 (the environmental testing laboratory 2A) by the length of the gap 109t.

The curtain rail 152 may be formed of, for example, an aluminum alloy or the like. The support steel material 153, the bracket 154, the bolt (or screw) 155, and the like may be formed of, for example, stainless steel.

The support portion 151a of the suspension member 151 may be modified to, for example, a support portion 151aa shown in FIG. 10C or a support portion 151ab shown in FIG. 10D. The support portion 151aa shown in FIG. 10C has a structure in which a part thereof can be opened and closed by a spring. The support portion 151ab shown in FIG.

10D has a structure in which a part thereof can be opened and closed by a screw and a shaft that are removable.

As shown in FIG. 11A, the floor surface 101b of the flow passage part 101 (the environmental testing laboratory 2A) is provided with the hook portion 161 for securing the curtain 103A. The lower edge portion of the curtain 103A and the hook portion 161 are each provided with a hole portion. By passing the rubber band 162 through both of the hole portions, the lower edge portion of the curtain 103A is secured to the hook portion 161. As shown in FIG. 11B, the hook portion 161 may have an embedment structure capable of moving in the arrow directions. Having such a structure, the hook portion 161 may be pulled out from the floor surface 101b and used only when securing the curtain 103A, and at other times, may be retracted to the floor surface 101b. FIG. 11C shows the configuration of the rubber band 162 not in use. As shown in FIG. 11A, the lower edge portion of the curtain 103A secured to the hook portion 161 with the rubber band 162 is positioned away from the floor surface 101b of the flow passage part 101 (the environmental testing laboratory 2A) by the length of the gap 109b. The curtain 103A develops vertically due to the weight of the curtain 103A itself, the weight of a metal fitting (not shown) attached to the curtain 103A, the contracting force of the rubber band 162, and the like. The length of the gap 109b changes according to how much the curtain 103A develops vertically. Thus, the environmental testing laboratory 2A may be configured such that the gap 109b is closed by the curtain 103A.

As shown in FIG. 9, a radiant heat insulating material having the specular reflection surface F11 and the diffuse reflection surface F12 may be used as a material for the curtain 103A, like the flow straightening member 103 of Embodiment 1. The curtain 103A may be installed so that its surface facing the sidewall surface 101s of the flow passage part 101 (the environmental testing laboratory 2A) is the specular reflection surface F11 and its surface not facing the sidewall surface 101s is the diffuse reflection surface F12. Thereby, the environmental testing laboratory 2A according to the present embodiment can help prevent the temperature of the space outside of the curtain 103A from being transferred to the space inside of the curtain 103A (the measurement target space).

In Embodiment 2, the flow straightening members of the environmental testing laboratory 2A are formed by the curtains 103A. In the environmental testing laboratory 2A thus configured, the curtains 103A can be developed (moved) and folded when the measurement target TG is to be carried into the installation part 102 provided at or near the center. Thus, the above configuration makes it easy to carry the measurement target TG and the optical measurement device into the installation part 102.

As described above, the environmental testing laboratory 2A according to Embodiment 2 enables optical measurement with high precision in an environment of atmospheric pressure, like the environmental testing laboratory 2 according to Embodiment 1.

Moreover, the environmental testing laboratory 2A according to Embodiment 2 can make it easier to carry the measurement target TG and the optical measurement device into the installation part 102 than the environmental testing laboratory 2 according to Embodiment 1.

The present invention is not limited to the embodiments described above and includes various modifications. For example, the above embodiments are described in detail to illustrate the prevent invention in an easy-to-understand way, and the present invention is not necessarily limited to a mode including all the features described. A feature in the configuration of the embodiment may be replaced with a different feature, or a different feature may be added to the configuration of the embodiment. Also, a different feature may be added to a given feature in each configuration, or the given feature may be deleted or replaced.

[Modifications]

For example, the environmental testing laboratory 2 according to Embodiment 1 described earlier may be modified as the following first to fourth modifications. Although not described here, the environmental testing laboratory 2A according to Embodiment 2 can be modified as the following first to fourth modifications like the environmental testing laboratory 2 according to Embodiment 1.

(First Modification)

Figure 12A:
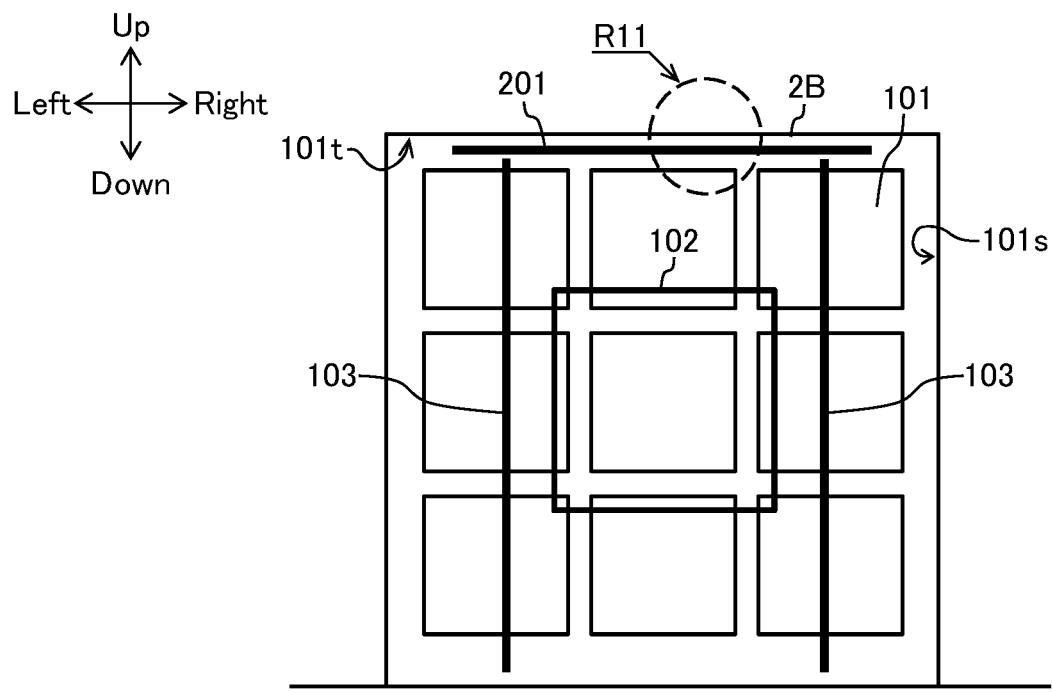
FIG. 12A is a configuration diagram (1) of an environmental testing laboratory of a first modification.
Figure 12B:
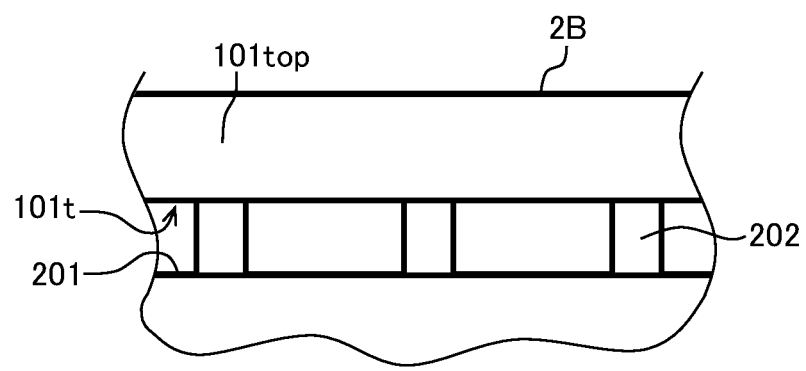
FIG. 12B is a configuration diagram (2) of the environmental testing laboratory of the first modification.

FIGS. 12A and 12B are each a configuration diagram of an environmental testing laboratory 2B of a first modification. FIG. 12A shows the overall configuration of the environmental testing laboratory 2B of the first modification, and FIG. 12B shows a region R11 in FIG. 12A in closeup.

As shown in FIG. 12A, the environmental testing laboratory 2B of the first modification differs from the environmental testing laboratory 2 according to Embodiment 1 (see FIG. 3) in including aboard 201 between the ceiling surface 101t of the flow passage part 101 and the installation part 102. The board 201 is formed by a board-shaped object and is a flow straightening member different from the flow straightening members 103. As shown in FIG. 12B, the board 201 is attached to the ceiling surface 101t of the flow passage part 101 with spacers 202 interposed therebetween. The board 201 is wider than the distance between the two flow straightening members 103 and is placed above the two flow straightening members 103.

The board 201 is placed in parallel with the direction of the airflow of air-conditioned air and is made of a radiant heat insulating material. Thus configured, the environmental testing laboratory 2B of the first modification can insulate radiant heat from the ceiling surface 101t as well to prevent heat transfer to the installation part 102.

(Second Modification)

Figure 13:
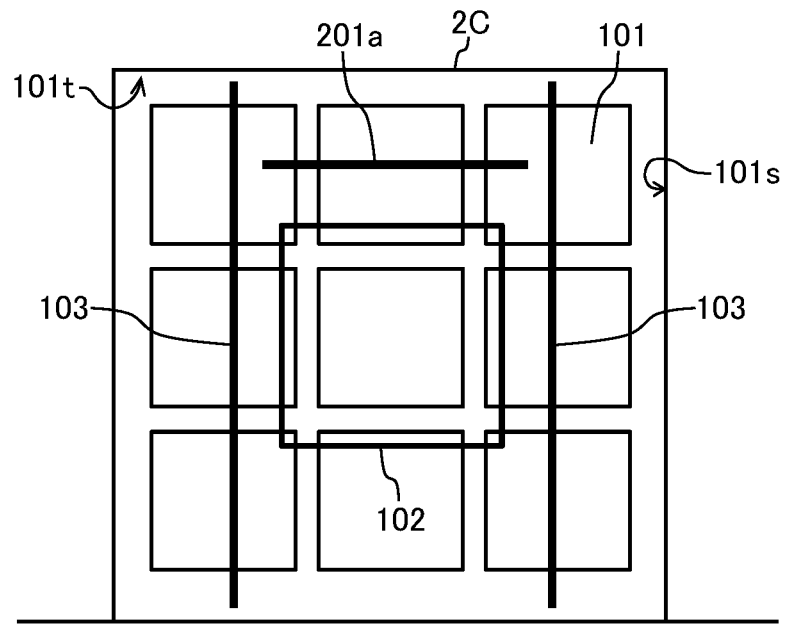
FIG. 13 is a configuration diagram of an environmental testing laboratory of a second modification.

FIG. 13 is a configuration diagram of an environmental testing laboratory 2C of a second modification. As shown in FIG. 13, the environmental testing laboratory 2C of the second modification differs from the environmental testing laboratory 2B of the first modification (see FIG. 12A) in including a board 201a in place of the board 201. The board 201a is a member having a function similar to the board 201 (see FIG. 12A). The width of the board 201a is shorter than the distance between the two flow straightening members 103 and is placed between the two flow straightening members 103.

Like the board 201 of the first modification (see FIG. 12A), the board 201a is placed in parallel with the direction of the airflow of air-conditioned air and is made of a radiant heat insulating material. Thus configured, like the environmental testing laboratory 2B of the first modification (see FIG. 12A), the environmental testing laboratory 2C of the second modification can insulate radiant heat from the ceiling surface 101t as well to prevent heat transfer to the installation part 102.

(Third Modification)

Figure 14:
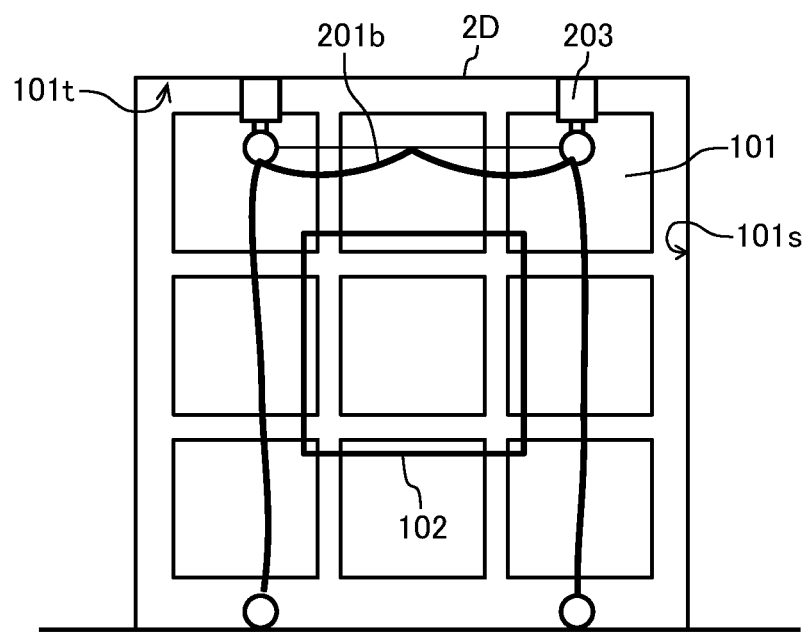
FIG. 14 is a configuration diagram of an environmental testing laboratory of a third modification.

FIG. 14 is a configuration diagram of an environmental testing laboratory 2D of a third modification. As shown in FIG. 14, the environmental testing laboratory 2D of the third modification differs from the environmental testing laboratory 2 according to Embodiment 1 (see FIG. 3) in including a cloth material 201b in place of the flow straightening members 103. The cloth material 201b is a different flow straightening member having a function similar to the flow straightening members 103. The cloth material 201b is attached to the ceiling surface 101t of the flow passage part 101 by suspension securing members 203 and is placed to surround both sidewall surfaces and the ceiling surface of the installation part 102. The cloth material 201b is placed substantially in parallel with the direction of the airflow of air-conditioned air and is made of a radiant heat insulating material. Thus configured, the environmental testing laboratory 2D of the third modification can insulate radiant heat from the sidewall surfaces 101s and radiant heat from the ceiling surface 101t to prevent heat transfer to the installation part 102.

(Fourth Modification)

Figure 15:
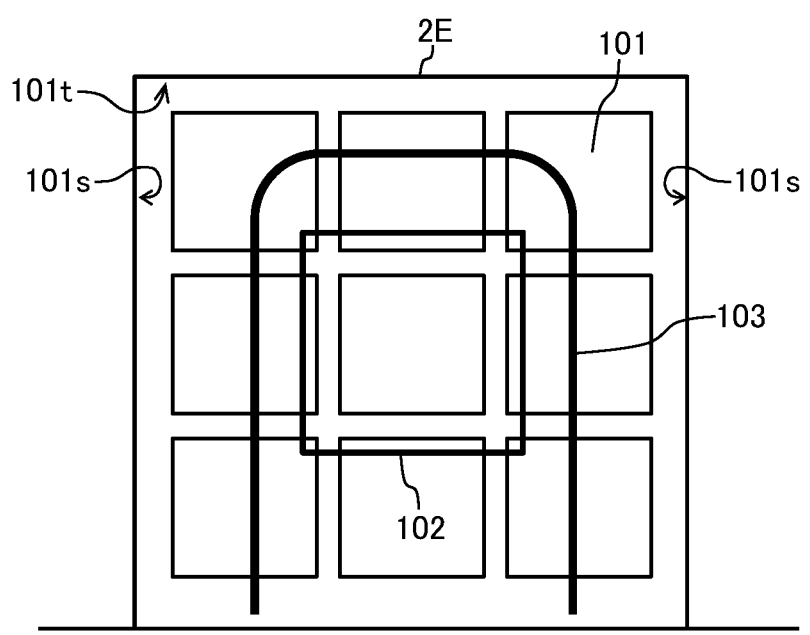
FIG. 15 is a configuration diagram of an environmental testing laboratory of a fourth modification.

FIG. 15 is a configuration diagram of an environmental testing laboratory 2E of a fourth modification. As shown in FIG. 15, the environmental testing laboratory 2E of the fourth modification differs from the environmental testing laboratory 2 according to Embodiment 1 (see FIG. 3) in the shape of the flow straightening member 103. Specifically, in the environmental testing laboratory 2E of the fourth modification, the flow straightening member 103 is placed to form an inverted U shape in a front view, surrounding both sidewall surfaces and the ceiling surface of the installation part 102. The flow straightening member 103 is placed substantially in parallel with the direction of the airflow of air-conditioned air and is made of a radiant heat insulating material. Thus configured, the environmental testing laboratory 2E of the fourth modification can insulate radiant heat from the sidewall surfaces 101s and radiant heat from the ceiling surface 101t to prevent heat transfer to the installation part 102.

REFERENCE SIGNS LIST 1 air conditioning system
2, 2A, 2B, 2C, 2D, 2E environmental testing laboratory
2in supply port
2out discharge port
3 dehumidifying part (dehumidifying means)
4 dry air temperature adjusting part (dry air temperature adjusting means)
5 dry air heating part (dry air heating means)
6 circulation flow passage
11 to 14 valve
15 bypass duct
21 vibration isolating base
22a, 22b base
23 valve
30 desiccant air conditioner
31, 34, 37 cooler
32, 35, 38 temperature sensor
33, 36, 39 control device
301 desiccant rotor
302, 303 air blower
304 heater
40 cooling duct
41 air blower
42 cooler (dry air cooling means)
43 chiller (coolant cooling means)
47 tank
48 heater (coolant heating means)
49, 63 temperature sensor
61, 62 control device
51, 54 heater
52, 56 temperature sensor
53, 57 control device
55 heat storage
101 flow passage part
101b floor surface
101t ceiling surface
101top ceiling panel
101s sidewall surface
102 installation part
103 flow straightening member
103A curtain (flow straightening member)
103b lower edge portion
103t upper edge portion
109b, 109t gap
151 suspension member
151a, 151aa, 151ab support part
151b runner
152 curtain rail
153 support steel material
154 bracket
155 bolt (or screw)
161 hook portion
162 rubber band
201, 201a board (different flow straightening member)
201b cloth material (different flow straightening member)
202 spacer
203 suspension securing member
401 phase-shifting interferometer (laser interferometer)
402 Michelson interferometer
403 reflector
404 sensor head
405a, 405b light
F11 specular reflection surface
F12 diffuse reflection surface
TG measurement target

The invention claimed is:

1. An environmental testing laboratory comprising:
a supply port allowing air-conditioned air at a predetermined temperature to be supplied through the supply port at a predetermined flow speed;
a discharge port facing the supply port and allowing the air-conditioned air to be discharged through the discharge port;
a flow passage part disposed between the supply port and the discharge port and allowing the air-conditioned air to pass through the flow passage part;
an installation part disposed at or near a center of the flow passage part and allowing a measurement target for optical measurement to be located in the installation part; and
a first flow straightening member which is disposed between a sidewall surface of the flow passage part and the installation part and which is configured to straighten an airflow of the air-conditioned air, wherein
the sidewall surface of the flow passage part and the first flow straightening member are disposed in parallel with a direction of the airflow of the air-conditioned air flowing from the supply port to the discharge port.

2. The environmental testing laboratory according to claim 1, wherein
the first flow straightening member comprises an upper edge portion and a lower edge portion,
the flow passage part comprises a first ceiling surface and a floor surface,
a first gap is disposed between the upper edge portion and the ceiling surface, and a second gap is disposed between the lower edge portion and the floor surface.

3. The environmental testing laboratory according to claim 1, wherein the first flow straightening member comprises a curtain configured to be developed and folded.

4. The environmental testing laboratory according to claim 3, further comprising a curtain rail, a suspension member, and a hook portion, wherein
the flow passage part comprises a first ceiling surface and a floor surface,
the suspension member is fitted inside the curtain rail,
the curtain rail provided on the ceiling surface and allowing the suspension member to slide along the curtain rail,
and the hook portion is provided on the floor surface and is configured to secure the curtain.

5. The environmental testing laboratory according to claim 1, wherein the first flow straightening member comprises a radiant heat insulating material.

6. The environmental testing laboratory according to claim 1, further comprising a second flow straightening member, wherein
the flow passage part comprises a first ceiling surface,
the second flow straightening member is disposed between the ceiling surface and the installation part,
the second flow straightening member is also disposed in parallel with the direction of the airflow of the air-conditioned air, and
the second flow straightening member comprises a radiant heat insulating material.

7. The environmental testing laboratory according to claim 6, further comprising a spacer, wherein
the second flow straightening member comprises a board-shaped object, and
the second flow straightening member is attached to the first ceiling surface of the flow passage part with the spacer interning between the second flow straightening member and the first ceiling surface.

8. The environmental testing laboratory according to claim 6, further comprising a suspension securing member, wherein
the second flow straightening member comprises a cloth object, and
the second flow straightening member is attached to the first ceiling surface of the flow passage part by using the suspension securing member.

9. The environmental testing laboratory according to claim 1, wherein
the installation part comprises opposite sidewall surfaces and a second ceiling surface,
the first straightening member is disposed over the opposite sidewall surfaces and the second ceiling surface, and
the first straightening member has an inverted U-shape in a front view.

10. An air-conditioning system comprising:
the environmental testing laboratory according to claim 1;
a circulation flow passage configured to return air-conditioned air discharged from the discharge port of the environmental testing laboratory to the supply port of the environmental testing laboratory;
an air blower disposed on the circulation flow passage and configured to blow the air-conditioned air;
a heater disposed on the circulation flow passage and configured to heat the air-conditioned air; and
a heat storage disposed near the supply port of the environmental testing laboratory and configured to heat the air-conditioned air to a preset air temperature.

* * * * *